United States Patent [19]

Gergele

[11] Patent Number: 5,228,755
[45] Date of Patent: Jul. 20, 1993

[54] RIM WITH GROOVE CLOSED BY AN ANNULAR PACKING PROVIDED WITH A VALVE

[75] Inventor: Jean Gergele, Chatel-Guyon, France

[73] Assignee: Compagnie Generale Des Etablissements Michelin - Michelin & Cie, Clermont-Ferrand Cedex, France

[21] Appl. No.: 848,867

[22] Filed: Mar. 10, 1992

[30] Foreign Application Priority Data

Mar. 29, 1991 [FR] France ................. 91 03998

[51] Int. Cl.⁵ ............................................ B60B 21/02
[52] U.S. Cl. ............................ 301/5.24; 152/DIG. 11; 152/427
[58] Field of Search ............................ 301/95-98, 301/5.24; 152/379.3, 379.4, 379.5, 381.4, 415, 427, 428, DIG. 7, DIG. 9, DIG. 11, DIG. 13

[56] References Cited

U.S. PATENT DOCUMENTS

| | | | |
|---|---|---|---|
| 1,693,859 | 12/1928 | Nelson | 301/5 VH |
| 2,634,785 | 4/1953 | Tubbs | 152/DIG. 11 |
| 2,823,724 | 2/1958 | Gill | 152/427 |
| 3,884,286 | 5/1975 | Verdier | 152/375 |

FOREIGN PATENT DOCUMENTS

| | | |
|---|---|---|
| 2345628 | 3/1975 | Fed. Rep. of Germany . |
| 2414885 | 11/1975 | Fed. Rep. of Germany . |
| 2331456 | 10/1977 | France . |
| 739529 | 11/1955 | United Kingdom ........ 152/DIG. 11 |

Primary Examiner—Russell D. Stormer
Attorney, Agent, or Firm—Brumbaugh, Graves, Donohue & Raymond

[57] ABSTRACT

The rim (1), which is intended to be equipped with a tire P of tubeless type, has a groove (11) adjacent the rim lip (10). This groove (11) is closed by an annular packing (2) having a valve (3). The valve body (32) is surrounded by a sheathing (21) of vulcanized rubber; the secant modulus of elasticity of which, under compression, is equal to at most 0.20 times the secant modulus of compression of the vulcanized rubber constituting the packing, these two moduli being measured under a relative deformation of 10%. A slot is provided in the rim for the entrance of inflation air.

5 Claims, 2 Drawing Sheets

RIM WITH GROOVE CLOSED BY AN ANNULAR PACKING PROVIDED WITH A VALVE

BACKGROUND OF THE INVENTION

The present invention concerns a rim intended to be equipped with a tire, more particularly of the tubeless type.

French Patent 2 257 442 teaches that such rims are generally provided with a groove which serves for the mounting and removal of the tubeless tire. As this rim groove serves only temporarily and its presence is disturbing, it has been proposed that it be shifted in the direction of the outer rim flange and that it be closed by means of a removable device. In order to assure perfect tightness of the pneumatic cavity and permit easy positioning, locking in position and removal, that patent recommends the use of a flexible, stretchable annular packing which forms the seat for the bead of the tire in question and, preferably, the use of a rubber packing which is compressible without variation of volume.

As shown in FIG. 6 of that patent, without other comment, the annular packing can have an inflation valve.

Whether it be under a tensile force, as is the case during the mounting and the putting in place of the packing, or as partially the case under the effect of centrifugal force, or under a compressive force under the effect of the clamping of the bead on the packing, the metal or plastic valve introduces a local variation of properties into the packing and accordingly a variation in behavior of the bead which rests on said packing. Conversely, the area around the valve is subjected to concentrations of stresses, which favors a premature detachment of the valve from the rubber of the packing. Furthermore, although less so than in the event that it is threaded into a metal part, the valve nevertheless remains vulnerable to impacts, particularly at the place of its embedment.

SUMMARY OF THE INVENTION

The object of the present invention is to overcome these drawbacks. Thus the rim in accordance with French Patent 2 257 442 has a base, two seats for the tire bead and two rim flanges, and is provided with a mounting groove close to the flange on the outside of the vehicle, and with an annular device, in the form of a flexible rubber packing, which closes said groove and serves as a seat for a tire bead and in which the inflation valve is inserted.

In accordance with the invention, this rim is characterized by the fact that the valve body is sheathed by a layer of vulcanized rubber of a thickness of between 0.5 mm and 10 mm and having a secant modulus of elasticity in compression under a relative deformation of 10% of at most 0.20 times the secant modulus of elasticity in compression with 10% deformation of the vulcanized rubber constituting the annular packing, and by the fact that the inner orifice of the valve communicates with a slot provided in the rim a nd intended for the entrance of the inflation air.

The secant modulus of compression of a vulcanized rubber measured at 10% deformation is equal to the ratio of the force of compression necessary to deform a test specimen of a given cross section by 10% to the product of said cross section by the relative deformation of 0.1. The two moduli concerned are measured under the same conditions.

The difference in modulus between the vulcanized rubber serving for the sheathing of the valve and the vulcanized rubber constituting the packing, in addition to solving the problem forming the basis of the invention, has an unexpected advantage. It consists in assuring a better tightness of the rolling unit. In fact, the orifice created in the rim for the passage of the valve head has a diameter larger than the diameter of the cylindrical valve body.

In the case of a normal valve inserted directly into the annular packing, the deformations suffered by the packing permit the passage of air between the rim and said packing at the level of said orifice.

On the other hand, in the case of a valve sheathed or covered by a vulcanized rubber of very low modulus as compared with the modulus of the vulcanized rubber of the packing, a displacement of the valve towards the outside is produced under the effect of the inflation pressure, which results in better tightness due to shearing of the sheathing of vulcanized rubber.

DESCRIPTION OF THE DRAWINGS

The invention will be better described with the aid of the accompanying drawing, which shows non-limitative embodiments.

DESCRIPTION OF PREFERRED EMBODIMENTS

Figure 1:
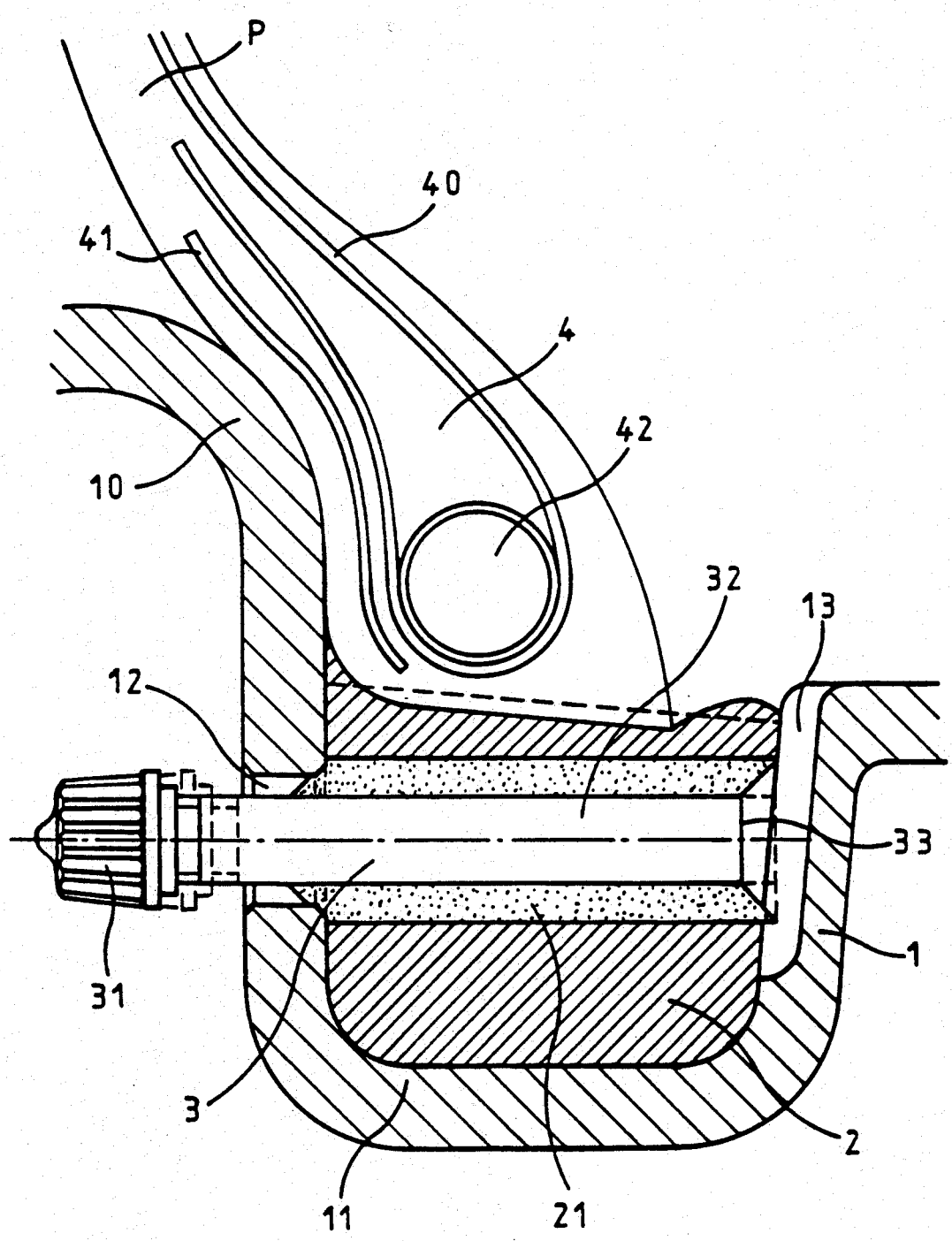
FIG. 1 of the drawings is a partial meridian section through the assembly formed by the mounting rim, the annular packing, the inflation valve and a tire bead.

The mounting groove 11 of the rim 1 is adjacent to the lip 10. This groove 11 is provided with a packing 2 which has a valve 3 having a valve cap 31 and a valve body 32. The radially outer face of the packing 2 serves as rim seat for the bead 4 of the tire P having a bead wire 42 around which a radial carcass reinforcement 40 is wound. This bead 4 is furthermore reinforced by a reinforcement ply 41 having cables which are slightly inclined with respect to the circumferential direction of the tire P.

The valve body 32 is surrounded by a sheathing 21 of vulcanized rubber, that is to say, a vulcanized mixture of elastomer, fillers and additives such as is currently used in rubber manufacture, having, on the one hand, the property of sticking to the brass-coated metal forming the valve body 32 and, on the other hand, a secant modulus of elasticity in compression under a relative deformation of 10% equal to 3 MPa, while the modulus of elasticity of the vulcanized rubber forming the rest of the annular packing 2 is equal to 33 MPa. The sheathing 21 has a thickness of 3.5 mm.

The inner orifice 33 of the inflation valve 3 communicates with an air passage slot 13 provided in the rim 1.

In the figure there are shown in dashed lines the axially inner and outer limits of the sheathed valve body before the placing of the corresponding bead of the tire on the seat formed by the packing 2, while solid lines show the same limits after the mounting of the bead and the inflation of the tire. It is easy to see that the valve body 32 has been shifted axially towards the outside of the rolling unit, the resulting deformation of the sheathing 21 in the valve hole 12, made in the rim 1, permitting improved tightness.

Figure 2:
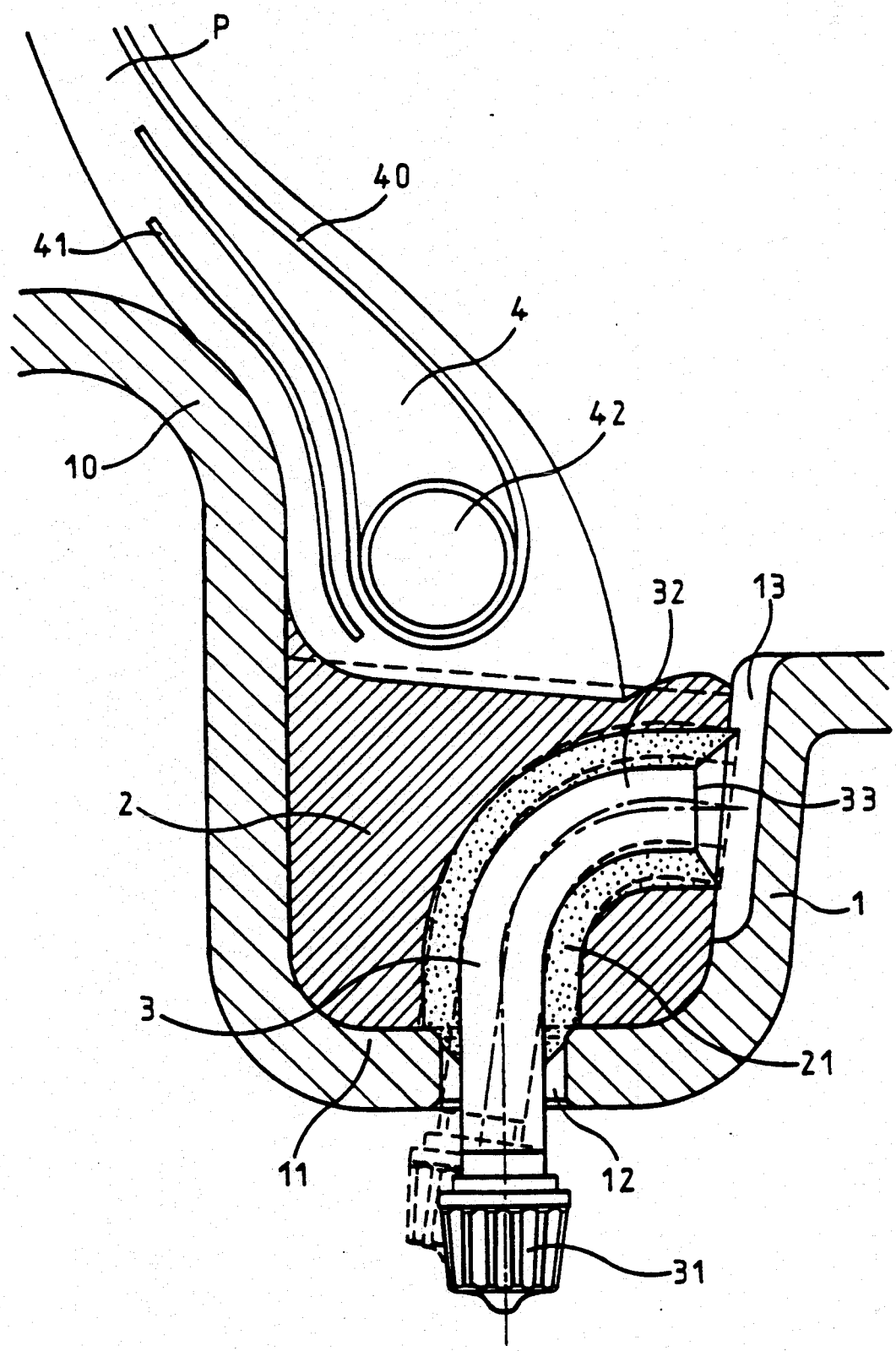
FIG. 2 shows a packing with a bent valve.

Retaining, for greater simplicity, the same reference numerals, FIG. 2 shows a valve 3 which differs from the valve 3 of FIG. 1 only by its shape, the valve body 32 being bent so as to have the entrance orifice of the valve 3 radially on the interior of the rim 1.

I claim:

1. A tire rim having a base, two seats for the beads of a tire, two rim flanges, a mounting groove provided in each rim flange adjacent the rim flange on the outside of the vehicle, an annular flexible packing of rubber filling the groove and serving as a seat for a bead of the tire, an inflation valve accommodated in the flexible packaging, a layer of vulcanized rubber intermediate the inflation valve and the flexible packing and sheathing the inflation valve, said layer of vulcanized rubber having a thickness of between 0.5 and 10 mm and having a secant modulus of elasticity in compression which is equal to at most 0.20 times the secant modulus of elasticity in compression of the vulcanized rubber forming the flexible packing, these secant moduli being measured for a relative deformation of 10%, and a recess provided in the rim in communication with the inner orifice of the valve, said recess being in communication with the interior of a tire supported on the rim.

2. A rim according to claim 1, characterized by the fact that the valve body is bent so that the entrance orifice of the valve is located radially to the inside of the rim.

3. A tire rim assembly for seating the bead of a tire comprising a channel formed in the rim, a resilient packing accommodated in the channel for seating the bead of the tire, a valve for inflating the tire having an inlet end accessible outside the rim and a discharge end in communication with the interior of a tire seated on said resilient packing and a sheathing of vulcanized rubber interposed between the valve and the packing, the sheathing having a thickness of between 0.5 mm and 10 mm, and having a secant modulus of elasticity in compression which is equal at most to 0.20 times the secant modulus of elasticity in compression of the resilient packing, these secant moduli being measured for a relative deformation of 10%.

4. A tire rim assembly as set forth in claim 3 including an aperture in the rim to accommodate the valve at the inlet end, the outward displacement of the valve caused by seating of the bead and inflation of the tire urging the sheathing tightly against the perimeter of the opening.

5. A tire rim assembly as set forth in claim 3 in which the channel is defined in part by an inner wall and including a recess in said inner wall establishing communication between the discharge end of the valve and the interior of the tire.

* * * * *